United States Patent [19]

Ueda

[11] 4,412,919

[45] Nov. 1, 1983

[54] WATER PURIFICATION DEVICE

[75] Inventor: Yoshihiko Ueda, Yamaguchi, Japan

[73] Assignee: Takara Kogyo Co., Ltd., Tokyo, ; a part interest

[21] Appl. No.: 372,235

[22] Filed: Apr. 26, 1982

[51] Int. Cl.³ .......................................... B01D 29/38
[52] U.S. Cl. ................................. 210/189; 210/274; 210/512.1
[58] Field of Search ............... 210/108, 119, 124, 136, 210/189, 265, 266, 268, 269, 274, 275, 279, 289, 291, 512.1

[56] References Cited

U.S. PATENT DOCUMENTS

| | | | |
|---|---|---|---|
| 2,010,435 | 8/1935 | Matheson | 210/512.1 |
| 2,468,838 | 5/1949 | Rey | 210/275 |
| 3,298,791 | 1/1967 | Meyer et al. | 210/189 |
| 3,428,177 | 2/1969 | Duff | 210/108 |
| 3,764,005 | 10/1973 | Zemanek | 210/512.1 |
| 4,076,625 | 2/1978 | Scholten et al. | 210/275 |
| 4,094,790 | 6/1978 | Schmidt | 210/289 |
| 4,197,201 | 4/1980 | Hjelmner et al. | 210/189 |
| 4,330,401 | 5/1982 | Boze et al. | 210/189 |

*Primary Examiner*—Ivars C. Cintins
*Attorney, Agent, or Firm*—Wenderoth, Lind & Ponack

[57] ABSTRACT

A water purification device wherein a separation tank is placed in a space of a filter tank above a mass of granular filter material, the separation tank having an inlet through which washing water which has been supplied into the filter tank for washing the filter material and the entrained granular filter material is supplied into the separation tank during washing of the filter material. The water and entrained filter material are caused to descend in a vortex flow and the granular filter material is separated and collects at an outlet at the bottom of the separation tank which is closed by a cover member. A rod- or cylinder-like member is mounted generally along the central vertical axis of the separation tank. The vortex flow of the washing water is reversed and caused to flow in a gyratory flow along the outer peripheral surface of the rod-like member and to be discharged from the filter tank through a water outlet. The granular filter material entrained in the contaminated washing water is separated by centrifugal force in the vortex flow and the reversed gyratory flow and collected at the bottom of the separation tank bottom and eventually returned to the filter tank. The loss of the filter material is thus prevented during washing of the filter material.

7 Claims, 9 Drawing Figures

WATER PURIFICATION DEVICE

This invention relates to a water purification device, and more particularly to a water purification device provided with a separation tank in the filter tank and which is so designed that, during washing of the granular filter material, such as y countercurrent washing, such granular material will not be entrained in the drain water and discharged therewith out of the filter tank.

BACKGROUND OF INVENTION AND PRIOR ART

In FIG. 1, there is shown an example of a previously proposed water purification device equipped with a separation tank. In FIG. 1, numeral 1 denotes a filter tank, only the upper part of which is shown, and in the lower part of which is provided granular filter material mainly consisting of filter sand, not visible in the drawing, and in the upper part of which is provided a separation tank 2. The separation tank 2 is cylindrical and has a laterally directed inlet 3 at the upper part thereof through which water discharged from tank 1 is supplied during washing. The lower part of the tank 2 has the shape of a hopper and is provided with an outlet 4 for a granular filter material. A cover plate 5 is mounted on the outlet 4 in an inclined position for opening and closure as desired. In the upper wall of the separation tank 2, there is mounted a water outlet 6a corresponding to the water inlet 3. The outlet 6a is connected to an external water drain pipe 6.

During washing of the granular filter material, the washing water introduced under pressure into filtration tank 1 flows into separation tank 2 via water inlet 3 so as to cause a vortex flow 7a of water along the inner wall, the water having granular filter material from tank 1 entrained therein. The vortex flow 7a travels spirally downwardly along the inner wall of the separation tank 2. The granular filter material entrained in the water is separated centrifugally and deposited along the inner lower wall of the tank 2. The cover plate 5, which is normally closed during washing under the effect of buoyancy, is opened under the weight of the accumulated filter material, so that the filter material is returned to the lower portion of the filter tank 1. The direction of flow of the discharged washing water is reversed at the bottom of tank 2 and it rises through the tank 2 centrally as tornado flow 7b so as to be discharged to the outside through water outlet 6a and water drain pipe 6.

In the conventional water purification device of this kind, contaminated water resulting from the washing operation is discharged to the outside as a tornado flow 7b in the separation tank 2, so that heaped filter material may be entrained in the tornado flow and discharged to the outside with this washing water.

OBJECT OF THE INVENTION

The object of this invention is to provide an apparatus which will overcome these problems inherent in the prior devices, and to eliminate these problems by having a rod-like member of a certain thickness or diameter suspended in about the center of the separation tank.

BRIEF DESCRIPTION OF THE DRAWINGS

The present invention will now be described by referring to the accompanying drawings, in which.

DETAILED DESCRIPTION OF THE INVENTION

Figure 2:
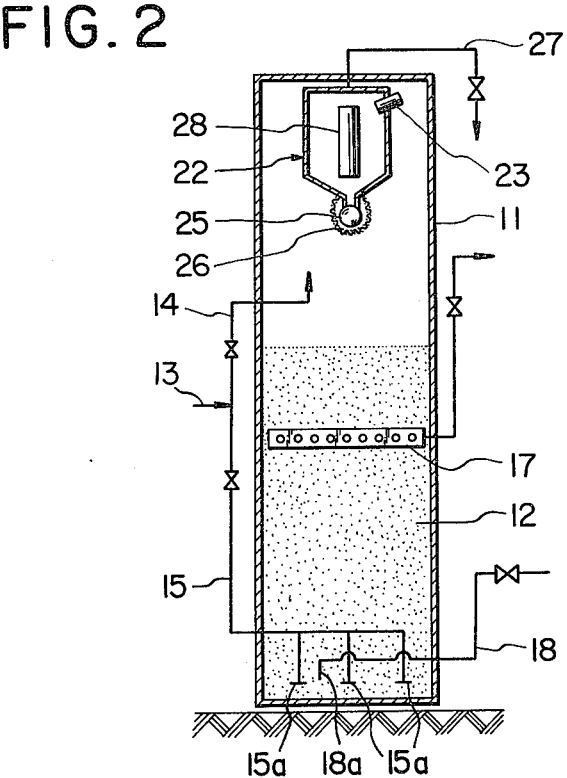
FIG. 2 is a vertical section of a first embodiment of the purification device according to the invention.
Figure 3:
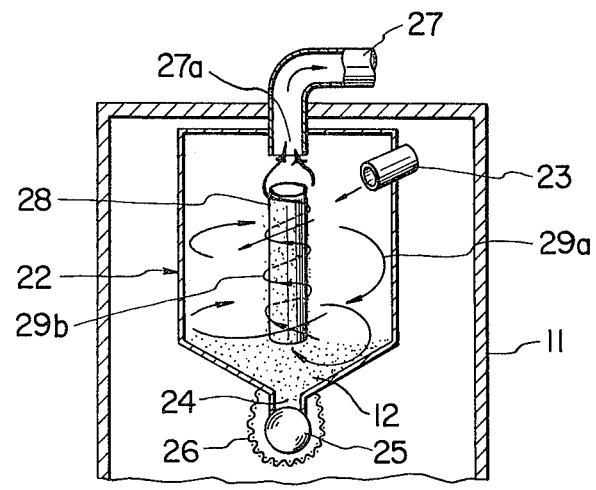
FIG. 3 is an enlarged partial section showing only the separation tank of the device of FIG. 2.
Figure 4:
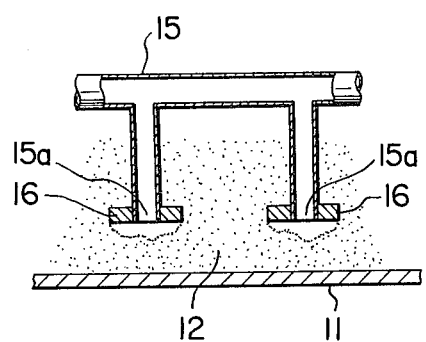
FIG. 4 is an enlarged partial section showing only the lower raw water inlet pipe of the embodiment of FIG. 2.
Figure 5:
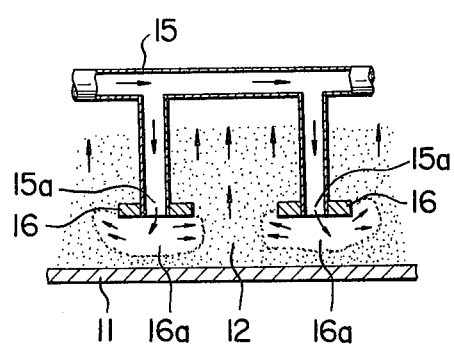
FIG. 5 is a view similar to FIG. 4 showing the lower inlet pipe of FIG. 4 during operation.

As shown in FIGS. 2–4, the embodiment comprises a filter tank 11, in the lower part of which is filled with a granular filter material 12 used for purification of raw waste water by filtration. Filter sand consisting, for example, of fine or coarse wet sand is used as the granular filter material. A raw waste water inlet pipe 13 which is branched into an upper inlet pipe 14 and a lower inlet pipe 15 is provided. The lower inlet pipe 15 is also used as an inlet for washing water (countercurrent washing water) and has its inlets 15a placed so as to open into the heaped layer of the granular filter material 12. The inlets 15a are provided with plates 16 defining respective inlet chambers. A water collecting strainer 17 is mounted within the heaped layer of the filter material 12 intermediate the upper pipe 14 and the lower pipe 15 for extraction of the filtered water. The water purification device shown in the drawings is designed as steric or double-stage water purification device having upper and lower inlet pipes 14 and 15 and the intermediate single strainer 17. Numeral 18 denotes an air injection nozzle for injection of air into the heap of the granular filter material 12 through the downstream end 18a.

In the upper part of the filter tank 11, in the space above the filter material 12, there is mounted a separation tank 22 having a tubular, e.g. cylindrical, configuration, as also shown in FIG. 3. The separation tank 22 is provided with a lateral inlet 23 at the upper part thereof and a hopper-like outlet 24 for granular filter material in the bottom thereof, as in the device shown in FIG. 1. A cover means in the form of a ball valve 25 is mounted in the filter material outlet 24 for preventing the inflow of the contaminated washing water. The ball valve 25 is a ball made of rubber or synthetic material into which heated and fused paraffin is injected and hardened in situ. The ball has a specific gravity equal to about 0.9 so that it will float when immersed in water. During washing, the filter material outlet 24 is closed due to such buoyancy of the ball. A retaining means in the form of a wire mesh basket 16 is placed around the valve 25' for retaining the ball valve 25 near the outlet 24 so that it will close the outlet when filter tank 11 is filled with washing water. The upper wall of the tank has a water outlet 27a at the upper end of the central vertical axis of the tank and which is connected to a water drain pipe 27. According to the invention, a rod-like member 28 having a desired diameter is suspended generally along the central vertical axis of the separation tank 22. The rod-like member 28 is, for example, a cylindrical member of a desired diameter, but it may be constituted by a rod or bar with a polygonal cross-section. The rod-like member is supported on the inner wall of the separation tank 22 by brackets, not shown, and is suitably spaced from both the upper water outlet 27a and the lower filter material outlet 24.

The operation of the water purification device in the raw water purification phase will first be explained. The valves in the upper inlet pipe 14 and the lower inlet pipe 15 are opened for supplying the raw water above and into the inside of the granular filter material 12. The raw water thus supplied flows through the filter material 12 in a laminar flow and is taken out through strainer 17 as purified water devoid of contaminants. Around the inlets 15a of the lower inlet pipe 15, the granular filter material 12 near-by is pushed aside by the hydraulic pressure of the inflowing water so that hollow inlet chambers or raw water chambers 16a of irregular shape are defined below plates 16. Due to the formation of the inlet chambers 16a, it is possible to prevent any clogging due to sludge films or coarse particles in the raw water inlets or washing water inlets (countercurrent washing water inlets) as later described.

The operation during the washing phase of the granular filter material will now be explained. When the filter material 12 has been stopped up due to its use for purification of the raw water, the lower inlet pipe 15 for raw water is used as the inlet pipe for washing water, i.e. the countercurrent washing water, and the valve associated with this inlet pipe is opened. Simultaneously, the valve of the air injection pipe 18 is opened for effecting combined washing, i.e. countercurrent washing, by both water and air. At this time, when the tank 11 becomes full of washing water, part of the granular filter material 12 is entrained by the injected air and mixed with contaminated washing water so as to flow into the separation tank 22 through inlet 23. The inlet 23 is directed generally tangentially of separation tank 22 so that the water flows down along the inner wall of the separation tank 22 in a vortex flow 29a. The granular filter material 12 mixed in the washing water is separated centrifugally from the water and descends in a spiral flow along the inner wall and is deposited on the tank bottom. During such washing, the filter material outlet 24 is closed by ball valve 25 due to the buoyancy of the ball valve. The descending discharge water is reversed at the bottom of tank 22 and rises along the central part of tank 22 in a gyratory rising flow 29b and is discharged through the water outlet 27a and a water drain pipe 27. Since the rod-like member 28 has a certain diameter, the diameter of the gyratory flow 29b is larger than the diameter of the rod-like member 28. Thus, even if a part of the granular filter material 12 in the tank bottom is entrained with this rising gyratory flow 29b, since the centrifugal force acting on the flow 29b is a function of its rotational diameter, the diameter can be made such that the granular material will be thrown outwardly in the course of its upward travel thereof and transferred to the vortex flow 29a so as to be further separated and deposited on the tank bottom. Thus, the granular filter material 12 entrained in the discharged washing water will not be discharged to the outside along with the waste water. The granular filter material 12, thus washed by combined washing with air and water, is then finish washed with use only of washing water. When the inflow of washing water ceases, the ball valve 25 falls so as to open the filter material outlet 24 to permit the heaped material to descend to the lower zone of the filter tank 11.

The air injected during combined washing by air and water is discharged via water outlet 27a through the drain water pipe 27 along with the water.

Figure 6:
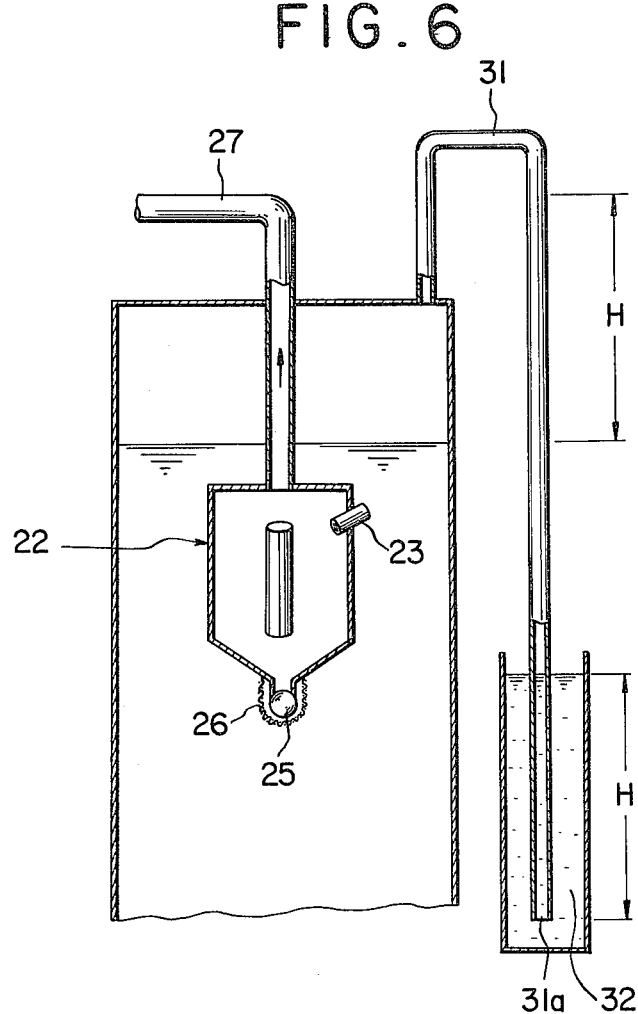
FIG. 6 is a partial vertical section of a second embodiment of the invention.

FIG. 6 shows a second embodiment of the present invention. In FIGS. 6–8, the same or equivalent parts as those shown in FIGS. 2 through 4 are denoted by the same reference numerals as those used in FIGS. 2 through 4, and the corresponding description has been omitted for brevity sake. In FIG. 6, an air discharge pipe 31 is provided separately from the washing water discharge pipe 27 for discharge of the air used in the combined washing. The outer extreme end 31a of the air discharge pipe 31 is positioned in means in the form of a water seal tank 32 mounted laterally of the filter tank 11 for producing a back pressure in said pipe 31. During combined washing, since the outer extreme end 31a of the pipe 31 is water sealed, a pressure equal to a water column of a length H in the water sealing tank 32 will be produced in the upper portion of the filter tank 11 to form a space corresponding to such hydraulic pressure. The separation tank inlet 23 is located below this space. Thus the air will not flow into the separation tank 22 and, since the space is produced in the upper portion of the tank 11 as described above and the washing air is discharged through this space, there is less possibility that the granular filter material 12 will flow out of the filter tank and be lost during washing.

Figure 7A:
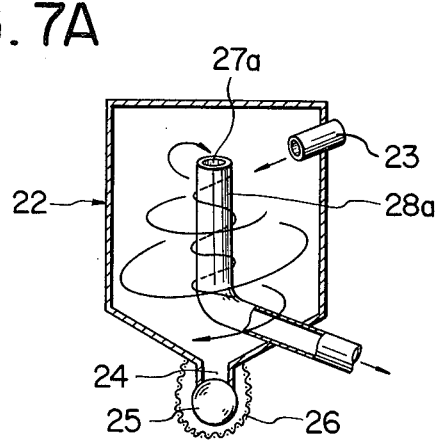
FIGS. 7A and 7B are vertical sectional views showing modified separation tanks.
Figure 8:
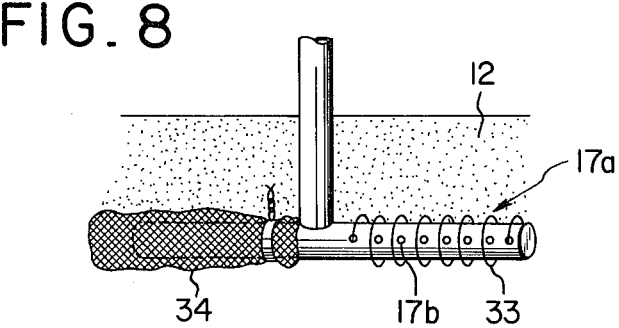
FIG. 8 is an elevation view showing a modified strainer.

FIG. 7A shows a modified separation tank 22a. In this modification, the rod-like member 28a also constitutes the discharge pipe. Thus, the rod-like member is replaced by a cylindrical member 28a having its lower portion bent and extending through the bottom of the separation tank 22 and extending externally of the tank 11. According to this modification, there is no necessity to provide a separate discharge pipe and hence the overall device may be simplified.

Figure 7B:
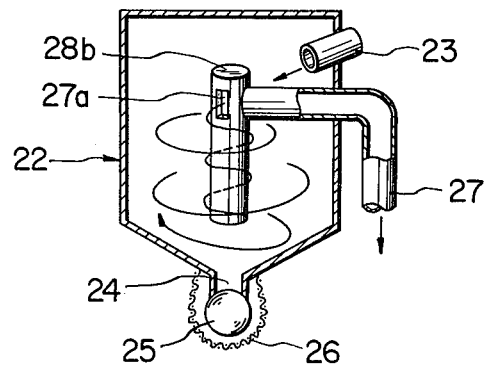

A further modified separation tank 22 is shown in FIG. 7B. In this modification a water discharge pipe 27 extends externally of the filter tank laterally from the upper portion of a closed hollow cylindrical member 28b which is used in place of the rod-like member. A water outlet 27a is provided at the upper lateral portion of the member 28b.

FIG. 8 shows a modified water collecting strainer 17a. According to this modification, the pipe proper of the strainer 17a is provided with a plurality of water collecting apertures 17b and it has a wire or similar filamentary material 33 spirally wound therearound which in turn is covered by a filter element 34 such as a nylon mesh tubular pouch. The filter element 34 may be moved to and fro during any oscillatory motion of the granular filter material. In this modification, clogging of the strainer 17a can be prevented from occurring, and the purification device may be a suction type. The filter tank 11 may thus be an open type, thus facilitating the manufacture and reducing manufacture costs. Moreover, because of the oscillation of the filter 34 caused by oscillation of the granular filter material, during washing of the filter material, clogging of the filter 34 can be eliminated.

Although the separation tank 22 is shown in FIG. 3 as having a hopper-like bottom, the tank may have a bottom in the form of a flat plate. In this case, too, the granular filter material 12 tends to be shifted towards the center and hence towards the filter material outlet 24, because of the gyratory descending motion of the filter material.

Figure 1:
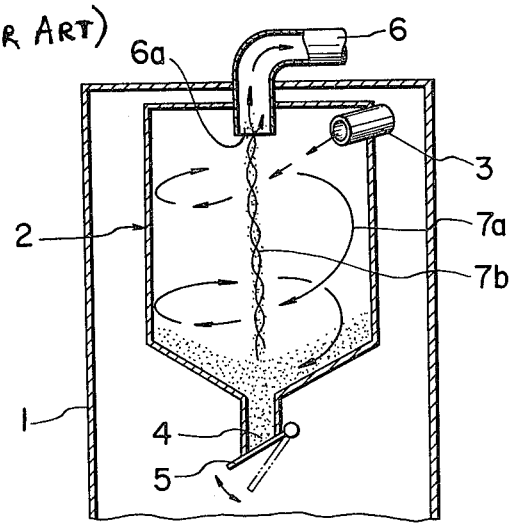
FIG. 1 is a partial section elevation view of a prior art water purification device.

The filter material outlet 24 may be closed by a cover plate as shown in FIG. 1 instead of ball valve 25.

Thus, according to this invention, a rod- or cylinder-like member of desired diameter is suspended in about the center of the separation tank for producing a gyratory flow of drain or discharged washing water with a desired rotational diameter, so that the granular filter material occasionally entrained in the contaminated washing water will be separated more completely and thus prevented from flowing out of the filter tank. Moreover, purified water may be supplied at all times from the present purification device. Fountain water in the parks, pond water or water in a fish farm may be directly supplied for circulation through this device, as well as water for water mains or industrial water.

In addition to these advantages, the various embodiments of the invention depicted above have the following advantages.

In the modified embodiment of the invention wherein the air discharge pipe is provided separately from the drain water pipe and has its outer end portion immersed in the water sealing tank, outflow of the granular filter material can be prevented more effectively.

In the modification wherein the inlet ends of the washing water inlet pipes used simultaneously as raw water inlet pipes are fitted with plates defining inlet chambers, the raw water or washing water inlets are prevented from clogging.

In the modification wherein the rod-like member in the separation tank is replaced by a tubular member used as drain water pipe, the overall device may be simplified in structure.

Finally, in the modification wherein the strainer is covered by a tubular wire mesh pouch or similar filter element, the purification device can be an open type, thus resulting in cost reduction and the filter elements will be automatically cleaned during washing of the filter material.

What is claimed is:

1. A water purification device comprising:
  a filter tank having water inlet means for the admission of water to be filtered and washing water thereinto, and filtered water outlet means;
  granular filter material for filtering of water and the like filling the lower portion of said filter tank with a space in said filter tank above said filter material;
  a separation tank mounted in said space in said filter tank and having a washing water inlet in the upper portion thereof from said space and directed generally tangentially of said separator tank;
  a washing water outlet means lying generally along the central vertical axis of said separation tank and communicating with the outside of the filter tank;
  a rod-like member positioned along said vertical axis of said separation tank, whereby when washing water is caused to flow into the tank and entrains the filter material and fills the tank, the filter material carrying washing water is directed by said washing water inlet in a vortex down along the inside surface of the wall of the separation tank, then inwardly thereof, and then along the peripheral surface of said rod-like member in reverse flow of water traveling upwards of the member with a gyratory motion and is discharged through said washing water outlet means; and
  a granular filter material outlet at the bottom of said filter material separation tank and having a cover means for closing and opening said outlet.

2. A device as claimed in claim 1 in which said rod-like member has a diameter for causing said gyratory motion to be sufficient for causing granular filter material entrained in washing water to be centrifugally separated from the washing water.

3. A device as claimed in claim 1 in which said washing water outlet means is in the top of said separation tank.

4. A device as claimed in claim 1 in which said washing water outlet means is in said rod-like member and extends from said rod-like member through the wall of said filter tank.

5. A device as claimed in claim 1 in which said cover means is a buoyant ball sufficiently large to close said outlet, and a mesh retaining means on the end of said outlet for keeping said ball sufficiently close to said end of said outlet to move into said end for closing the outlet when said filter tank is filled with washing water.

6. A device as claimed in claim 1 in which said filter tank has an air inlet means for introducing air into said filter tank and an air outlet pipe opening out of the top thereof and having means for producing a back pressure in said air outlet pipe, whereby when air and washing water are introduced into said filter tank for washing said filter material, air under pressure will form an air space in the top of said filter tank above the level of the washing water, said separation tank being positioned below said space.

7. A device as claimed in claim 1 in which said filtered water outlet means comprises a collecting strainer in said granular filter material for collecting and withdrawing filtered water or the like from said filter tank, said collecting strainer comprising a pipe having apertures along the length thereof and extending out of said filter tank, a wire-like material spirally wound around said pipe, and a mesh tubular pouch secured over said wire-like material and being sufficiently large to be movable to and fro in said filter tank when said filter material is being washed by washing water.

* * * * *